United States Patent [19]
Fortune

[11] 3,886,798
[45] June 3, 1975

[54] TEMPERATURE PROBE

[76] Inventor: William S. Fortune, 14250 Dearborn St., Panorama City, Calif. 91402

[22] Filed: Aug. 22, 1973

[21] Appl. No.: 390,591

[52] U.S. Cl. ................. 73/343 R; 73/359; 136/230
[51] Int. Cl. ............................................. G01k 1/14
[58] Field of Search ...... 73/359, 343 F, 343 R, 341; 136/233, 232, 230, 229

[56] References Cited
UNITED STATES PATENTS

| | | | |
|---|---|---|---|
| 2,466,137 | 4/1949 | Vollrath | 73/359 |
| 2,666,799 | 1/1954 | Barsy | 136/232 |
| 3,232,794 | 2/1966 | Korton | 136/233 |
| 3,465,315 | 9/1969 | Alexander | 73/359 |

FOREIGN PATENTS OR APPLICATIONS

| | | | |
|---|---|---|---|
| 422,407 | 9/1925 | Germany | 73/359 |

OTHER PUBLICATIONS

"A Special Thermocouple for Measuring Transient Temperatures" by Bendersky in "Mechanical Enginnering" Feb. 1953 pages 117–121.
"Industrial Engineering Chemistry" Vol. 15 No. 8 pages 844–845 by Spear August 1923.

*Primary Examiner*—S. Clement Swisher
*Assistant Examiner*—Denis E. Corr
*Attorney, Agent, or Firm*—Daniel T. Anderson

[57] ABSTRACT

A temperature probe for measuring the initial transfer temperature from a soldering instrument to a circuit component or the like to be soldered. The temperature probe includes a thermocouple and a metal tube for housing the thermocouple. The open end of the metal tube is closed by a metal disk consisting of a metal which permits coating with a soldering compound. This makes it possible to measure the actual temperature at the tip of the soldering iron. Such a metal disk may consist of a commercially pure iron such, for example, as an electromagnet iron sold in the trade by Armco. The metal disk may have a rearwardly extending tubular extension for fitting it to the metal tube housing the thermocouple. The thermocouple may be welded or silver-soldered to its metal disk. A fixture is disclosed which permits releasably securing of the temperature probe to a soldering instrument.

3 Claims, 7 Drawing Figures

PATENTED JUN 3 1975   3,886,798

SHEET 2

TEMPERATURE PROBE

BACKGROUND OF THE INVENTION

This invention relates generally to the soldering art and particularly relates to a temperature probe for measuring the initial transfer temperature between a soldering instrument and a circuit component to be soldered.

Many temperature probes are known in the art. Some of these are designed to measure the temperature of a hot liquid or other materials at elevated temperatures. However, none of these known temperature probes are suitable for measuring the initial transfer temperature to the termination of a circuit component while it is being soldered. In some cases it is desirable to follow the variation of temperature during the soldering process, particularly where soldering takes an appreciable time.

For example, the patent to Feehan et al., U.S. Pat. No. 3,151,484 has suggested to press a temperature probe against a pipe which in turn conducts a hot fluid. This may be effected by attaching such as by welding a tube housing the temperature probe to a pipe conducting the hot fluid. A similar temperature probe for measuring the temperature of a fluid-filled system has been proposed in a U.S. Pat. to Karn, No. 3,531,993.

It has also been proposed to provide a thin metal disk to which the junction of the thermocouple is welded to obtain a fast response of the temperature detector. Such a temperature indicator has been disclosed in the patent to Alexander et al., U.S. Pat. No. 3,465,315. A power meter for measuring radiation based on similar principles has been shown in the patent to Mefferd et al., U.S. Pat. No. 3,596,514. In this case the thin metal disk may consist of aluminum to promote the quick transfer by thermal conductivity from the surface to be measured to the thermocouple.

Another temperature measuring device has been disclosed in the patent to Sterbutzel, U.S. Pat. No. 3,321,974. According to this patent the thermocouple is attached to the surface to be measured. Insulators are used to minimize the heat flow.

None of these patents, however, disclose a temperature probe for measuring the transfer temperature between a soldering instrument and the terminal of a circuit component.

It is accordingly an object of the present invention to provide a temperature probe suitable for measuring the transfer temperature between a soldering instrument and a terminal of a circuit component.

SUMMARY OF THE INVENTION

A temperature probe for measuring the temperature of a soldering instrument and particularly the transfer temperature to a circuit component to be soldered in accordance with the present invention comprises a thermocouple. The thermocouple has a temperature measuring junction and then is further provided a metal tube for housing the thermocouple and having an open end. Finally, a metal disk is secured to the open end of the tube. The junction of the thermocouple is in heat transfer contact with the metal disk which consists of a metal which permits coating with a soldering compound to measure the actual temperature at the tip of the soldering iron. Unless the temperature probe can be coated with the soldering compound the measurements will depend on the effects of a dirty surface or a surface which may not be entirely smooth or on variations of the pressure of the temperature probe. On the other hand the film of soldering compound between the temperature probe and the tip of the soldering instrument will eliminate or minimize these uncertainties.

Many metals are known which can readily be coated with a soldering compound. Among these are the so-called commercially pure iron which may, for example, be procured from Armco. Particularly suitable is a commercially pure iron known as electromagnet iron and also obtainable from Armco.

Electromagnet iron has been designed to minimize changes of the magnetic properties at elevated operating temperatures. Electromagnet iron is stabilized with aluminum and titanium to tie up the small amounts of carbon and nitrogen which are normally present in the iron. These elements would otherwise cause a slow change of magnetic and mechanical properties usually known as aging. It should also be noted that electromagnet iron has fewer surface defects which probably accounts for the fact that it can readily be coated with a soldering compound. In any case this commercially pure iron is available from Armco.

There is further disclosed in accordance with the present invention a fixture for releasably securing the temperature probe to the tip of a soldering instrument. This will permit to follow temperature changes during the soldering cycle, particularly where the soldering may take an appreciable period of time. In any case the temperature probe of the invention permits to measure the temperature drop caused by the thermal resistance and losses through the solder termination. The instrument is designed in keeping with the soldering art employed in the industry.

The novel features that are considered characteristic of this invention are set forth with particularity in the appended claims. The invention itself, however, both as to its organization and method of operation, as well as additional objects and advantages thereof, will best be understood from the following description when read in connection with the accompanying drawings.

DESCRIPTION OF THE PREFERRED EMBODIMENTS

Figure 1:
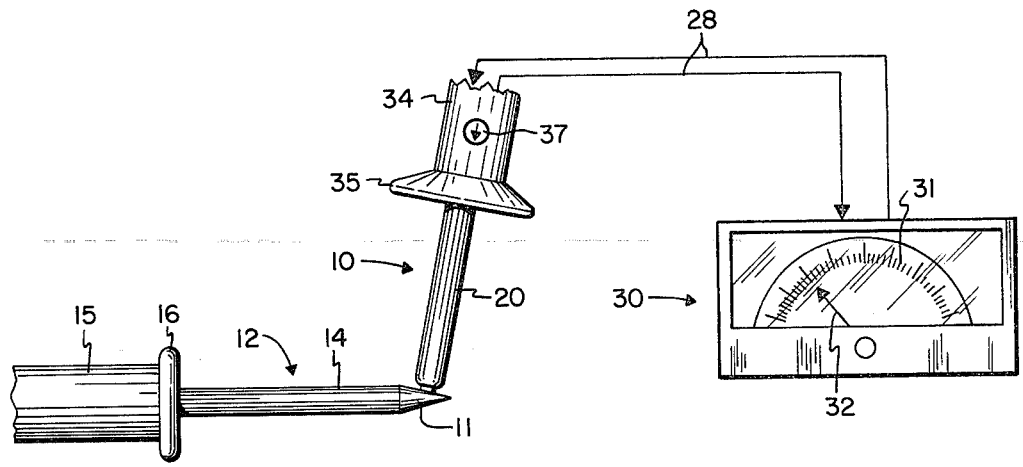
FIG. 1 is a view in perspective of a conventional soldering instrument and of the temperature probe of the invention touching the tip of the soldering instrument and a meter reading the temperature.
Figure 2:
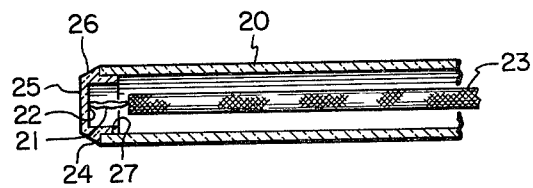
FIG. 2 is a cross-sectional view on enlarged scale through the tip of one embodiment of the temperature probe of the invention.
Figure 3:
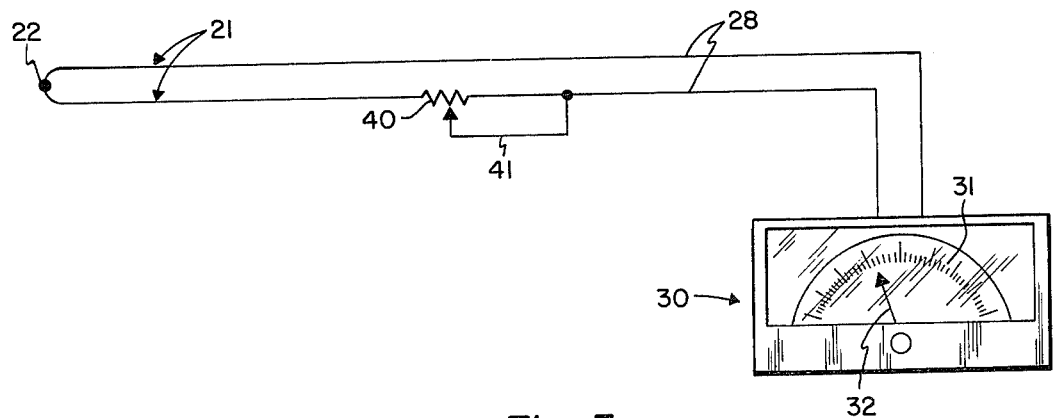
FIG. 3 is a schematic circuit diagram showing a thermocouple with means for controllably decreasing the output voltage generated by the thermocouple and connected to an indicating instrument.

Referring now to the drawings and particularly to FIGS. 1 – 3 there is illustrated by way of example one of the embodiments of the present invention. The temperature probe 10 of the present invention is shown contacting the tip 11 of a conventional soldering instrument shown at 12. The soldering instrument 12 has a heat element 14 extending into a handle 15 which may be provided at its end adjacent heat element 14 with a bumper ring 16.

The temperature probe 10 includes a metal tube 20 which may, for example, consist of stainless steel within which is disposed a thermocouple 21 having a junction 22. The rear portion of the leads of the thermocouple 21 may be covered by insulation 23. The open end 24 of the stainless steel tube 20 may be covered by a metal disk or button 25. In accordance with the present invention the button consists of a metal such as commercially pure iron or electromagnet iron as previously explained which may be readily coated with a layer of soldering compound.

Preferably, the metal disk or button 26 consists of a relatively thin sheet of metal which may, for example, have a thickness of between 10 and 20 mils and a diameter of ⅛ inch. The junction 22 may be spot welded to the metal disk 25 or it may be soldered thereto, for example, by silver solder. However, spot welding will provide a more permanent connection which will withstand higher temperatures.

As shown particularly in FIG. 2, the metal button 25 may have a rearwardly extending tubular extension 26 in which is provided an outer cylindrical recess 27 of a magnitude or diameter to receive the open end of the metal tube 20. The button 25 and the metal tube 20 may be joined by welding or by silver soldering. Alternatively, they may simply be held by mechanical friction, that is by a tight press fit.

The leads 28 of the thermocouple 21 may extend into an instrument 30 having a scale 31 and a pointer 32 for indicating the temperature. As is well known the junction 22 of the thermocouple will generate an electric voltage indicative of the temperature of the junction. Accordingly, the meter 30 may be a voltmeter calibrated to show temperatures on the scale 31.

The connection between the button 25 and the tip 11 of the soldering instrument 12 may be made by precoating the button 25 with the soldering compound. This will measure the initial transfer temperature between the soldering instrument 12 and the termination of the circuit element to be soldered. In other words due to the coat of soldering compound on the button 25 the temperature measured at the tip 11 of the soldering instrument 12 is similar to the temperature encountered during a normal soldering cycle.

The steel tube 20 may be mounted in a suitable handle 34 which may have a flared end portion 35. This may serve as a bumper for the instrument. The leads 28 of the thermocouple 21 will, of course, be insulated as they extend into the instrument 30.

In order to compensate for variations in the soldering load there may be provided a control knob 37 in the handle 34. The control knob 37 may be arranged to vary the voltage applied to the instrument 30. This may, for example, be effected by providing a variable resistor in series with one of the leads 28 of the thermocouple 21. This has been illustrated in FIG. 3 where a resistor 40 is shown serially connected with one of the leads 28. A slider 41 may bypass or short circuit a selected portion of the resistor 40 and the slider 41 may be operated by the knob 37 shown in FIG. 1.

Figure 4:
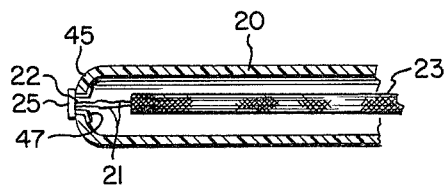
FIG. 4 is a cross-sectional view through the tip of a temperature probe in accordance with the present invention but illustrating a different construction of the heat transfer metal button.
Figure 5:
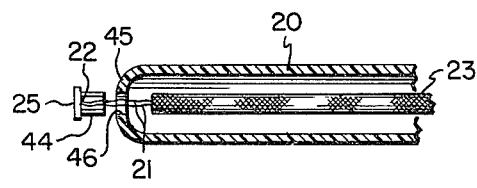
FIG. 5 is a cross-sectional view similar to that of FIG. 4 showing the button soldered to the thermocouple but spaced from its outer tube.

FIGS. 4 and 5 to which reference is now made illustrate an alternate construction of the temperature probe of the present invention. Here the button 25 is connected to the outer metal tube 20 by swadging. In other words this will provide a mechanical connection between the button 25 and the thermocouple housing tube 20.

As shown in FIG. 5, which is an exploded view of the temperature probe the button 25 is provided with a rearwardly extending tubular portion 44. On the other hand the metal tube 20 has an inwardly curved end portion 45 with a central aperture 46. The tubular portion 44 is now forced outwardly by swadging into intimate contact with the curved end portion 45 of the tube 20. This is shown at 47 in FIG. 4.

It will be apparent that many other types of connections may be provided between the button 25 and the tube 20. Again the junction 22 of the thermocouple 21 may be spot welded to the inner surface of the button 25 as previously explained.

Figure 6:
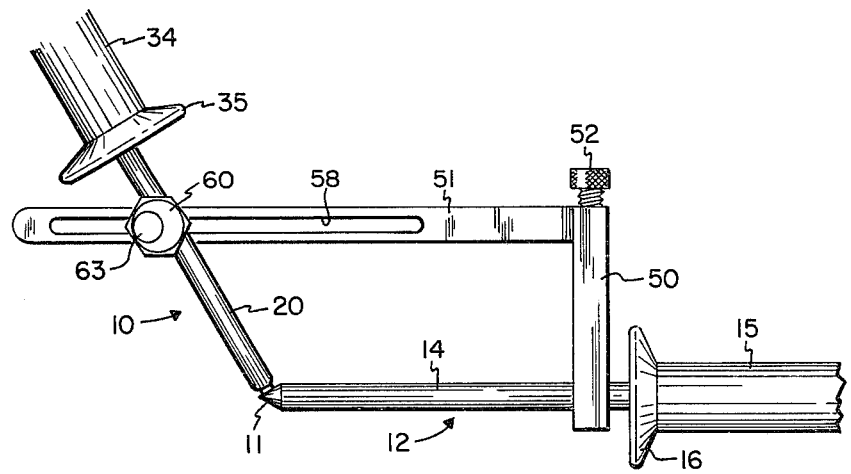
FIG. 6 is an elevational view of a conventional soldering instrument and of a temperature probe in accordance with the present invention releasably held against the tip of the soldering instrument by an adjustable fixture in accordance with the present invention.
Figure 7:
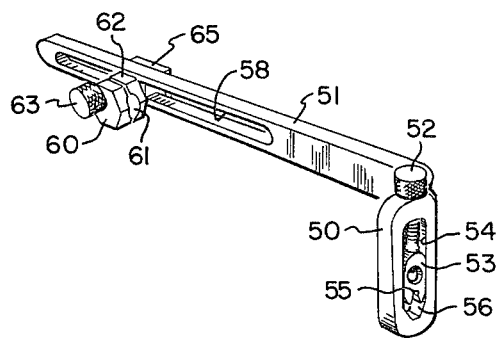
FIG. 7 is a view in perspective of the fixture of FIG. 6.

In some cases it may be desirable to measure not only the initial transfer temperature but the final transfer temperature between the tip 11 of a soldering instrument and a circuit component to be soldered. This is particularly important for long and heavy soldering cycles. In that case it would be desirable to provide a means for maintaining an intimate contact at a controlled pressure between the tip 11 of the soldering instrument and the temperature probe for the entire duration of the soldering cycle. To this end the fixture illustrated in FIGS. 6 and 7 may be used with advantage.

This fixture permits to releasably and adjustably maintain the temperature probe 10 in contact with the tip 11 of the soldering instrument. The fixture or bracket consists of two portions 50 and 51 which are preferably integral but may be made in two pieces and which extend at right angles to each other. The portion 50 of the bracket has a lock nut 52 extending through a screw threaded opening into a slider 53. The slider 53 is capable of sliding in an aperture 54 in the bracket portion 50. It has a lower portion ending in a W-shaped end 55 cooperating with a V-shaped slot 56. Accordingly by raising or lowering the clamping element 53 the portion 14 of the soldering instrument 12 may be releasably clamped or secured between the central portion of the slider 53 and the button portion of the slot 56.

The other portion 51 of the bracket is provided with a slot 58 along which may be moved a nut shaped element 60 having a circular transverse opening 61 and a relief slit 62 so as to tighten the thus formed portion of the nut 60. Another lock nut 63 extends through the relief slit 62 and through the slot 58 in the bracket portion 51 to a nut 65. Accordingly the clamping element or nut 60 may be slid along the slot 58. It may be rotated about its lock knob 63 and when tightened will securely hold the tube 20 of the temperature probe 10 at any predetermined angle with respect to the tip 11 of the soldering instrument 12.

It will be readily apparent now that the bracket 50 - 51 allows the operator to solder while simultaneously watching the temperature of the tip of the soldering instrument by the indicator 30.

There has thus been disclosed a temperature probe for measuring the temperature of a soldering instrument and particularly the transfer temperature to a circuit component or its termination to be soldered. The temperature probe has a temperature sensing button or metal disk capable of being coated with a soldering compound. This will not only establish conditions similar to those encountered by the soldering instrument during the soldering cycle but will also eliminate variations of the temperature due to impurities of the surface, variations of the contact pressure or changes of the smoothness of the surface. The temperature sensing button may be secured to a protecting metal tube in various ways. Also, the temperature readings may be adjusted for various soldering loads and the like. Finally, a fixture or bracket has been disclosed which permits to secure the temperature probe releasably and adjustably to the soldering instrument.

What is claimed is:

1. A temperature probe and fixture for measuring the temperature of a soldering instrument at the tip thereof during soldering, said temperature probe including:

a. a thermocouple having a junction for measuring the temperature;

b. an outer metallic tube surrounding said thermocouple;

c. a button closing one end of said tube and consisting of a metal capable of being coated with a soldering compound; and d. a fixture for securing said temperature probe to the soldering instrument, said fixture having a first portion capable of being attached to the soldering instrument;

e. means on said first portion for clamping it to the soldering instrument;

f. said fixture having a second portion rigidly secured to said first portion and bearing an element capable of receiving said temperature probe; and g. means cooperating with said element and said second portion for adjustably securing said temperature probe to the soldering iron.

2. A temperature probe and fixture as defined in claim 1 wherein the second portion of said tool is provided with a slot having means for adjustably securing said element along its length.

3. A temperature probe and fixture as defined in claim 1 wherein means is provided for rotatably securing said element to the second portion of said fixture to adjust the angle between said temperature probe and the soldering instrument.

* * * * *